United States Patent [19]

Andronov et al.

[11] 4,279,009
[45] Jul. 14, 1981

[54] METHOD AND REGULATING DEVICE FOR CONTROLLING HIGH-VOLTAGE DIRECT CURRENT TRANSMISSION SYSTEM

[76] Inventors: Valery A. Andronov, ulitsa Vernosti, 14, korpus 1; Alexandr I. Boyarsky, ulitsa Khlopina, 3, kv. 10; Viktor I. Emelyanov, prospekt Engelsa, 40, kv. 40; Iosif B. Nabutovsky, Beloostrovskaya ulitsa, 25, kv. 20, all of Leningrad, U.S.S.R.

[21] Appl. No.: 62,222

[22] Filed: Jul. 30, 1979

[51] Int. Cl.³ .................................................. H02J 3/36
[52] U.S. Cl. ........................................ 363/35; 363/51; 363/79
[58] Field of Search ...................................... 363/34–35, 363/37, 51, 78–79, 85–87, 96

[56] References Cited

U.S. PATENT DOCUMENTS

| | | | |
|---|---|---|---|
| 3,766,464 | 10/1973 | Reeve | 363/51 X |
| 3,801,895 | 4/1974 | Kanngiesser | 363/35 |
| 3,829,756 | 8/1974 | Hockstetter | 363/35 |
| 3,906,335 | 9/1975 | Watanabe et al. | 363/35 |
| 4,126,892 | 11/1978 | Ekstrom et al. | 363/51 X |

*Primary Examiner*—William M. Shoop
*Assistant Examiner*—Peter S. Wong
*Attorney, Agent, or Firm*—Steinberg & Raskin

[57] ABSTRACT

A method for controlling a high-voltage direct current transmission system having a rectifier and an inverter of the controlled valve type, including the step of reducing the reference value of the current supplied from the rectifier to the inverter in a direct relationship to the value of the differencae between a predetermined value and the smallest of the margin angles of the inverter valves when the smallest of the margin angles of the inverter valves falls below the predetermined value, the current reference value being set above or equal to the minimum permissible value. A regulating device for operating a high-voltage direct current transmission system comprises a measuring circuit for developing a signal corresponding to the smallest of the margin angles of the inverter valves and a reference current signal forming means including a subtraction circuit having its inputs connected to the output of the measuring circuit and to a reference signal source, a limiter having its input connected to the output of the subtraction circuit, a second subtraction circuit having its inputs connected to the output of the limiter and to a second reference signal source, and a minimum signal limiter having its input connected to the output of the second subtraction circuit. The output signal of the minimum signal limiter is supplied to a control device for adjustably controlling the firing angles of the rectifier valves.

4 Claims, 3 Drawing Figures

METHOD AND REGULATING DEVICE FOR CONTROLLING HIGH-VOLTAGE DIRECT CURRENT TRANSMISSION SYSTEM

FIELD OF THE INVENTION

The present invention relates to transmission of electrical energy, and more particularly to methods and regulating devices for controlling a high-voltage direct current transmission system.

The present invention can be used for protecting controlled valves of the converters in a high-voltage direct current transmission system in cases of disturbance. The present invention can most advantageously be used for protection, in cases of disturbance, of the controlled valves of the converters in high-voltage rectifier-inverter substations which connect electric power systems operating at different frequencies.

BACKGROUND OF THE INVENTION

A high-voltage direct current transmission system generally comprises polyphase bridge rectifiers of the controlled valve type at the transmitting end of the system and polyphase bridge inverters of the controlled valve type at its receiving end.

The occurrence of disturbances in such a system is usually brought about by a violation of the correct firing sequence of the controlled valves. Such a violation takes place when a valve is fired prematurely, e.g., breaks down in forward direction or refires immediately after extinguishment, or when a valve fails to turn on in time. Such disturbances usually lead to short-circuits in the converters through valves belonging to a common phase bringing about an increase in the rectified current, i.e., the current supplied from the rectifier to the inverter, and an increase in the time interval during which current flows through the valves. This, in turn, leads to overheating of the valves and their possible damage, as well as to load dumping. Besides, the increased rectified current makes more likely a reduction in the margin angles of the other valves of the converter bridge as well as of the valves of the other bridges. The margin angle is defined as a period, in electrical degrees, for which the instant at which the anode potential of the valve rises above its cathode potential is delayed with respect to the instant at which the current in the valve falls to zero. This reduction in the margin angles of the valves is attributable to the increase in their commutation angles caused by the growth of the rectified current. The commutation angle is defined as a period, in electrical degrees, during which the current in the valve falls to zero upon application of the firing pulse to another valve of the same bridge group, which is to be fired next in turn according to the firing sequence.

An excessive reduction in the margin angle of a valve makes it possible that the valve will not have enough time to deionize completely after being extinguished and before its anode becomes positive relative to its cathode, and hence will continue to conduct. This leads to a further violation of the operation sequence, which tends to further reduce the valve margin angles, and thus to increase the probability of further development of disturbances.

As a rule, the power system coupled at the inverter side has a considerable internal impedance. In such an event the increase in the rectified current resulting from the violation of the commutation sequence gives birth to distortions in the alternating voltage at the inverter output, which tends to further reduce the margin angles of the valves and increases the probability of further development of disturbances.

To diminish the negative results caused by faulty firing sequence of the inverter valves, a method for operating a high-voltage direct current transmission system was proposed according to which, when any one of the inverter valves fails to turn on in time, the next-in-turn valve of the same bridge group is fired before its time (cf. an article by B. S. Melik-Sarkisov "Protection of a Direct Current Transmission System" in "Izvestija Nauchno-Issledovatelskogo Instituta postojannogo toka", 1957, vol. 2, p.p. 84–95). The premature firing of the next-in-turn inverter valve insures the extinguishment of the conducting valve of the same group in due time, thereby preventing the occurrence of a short-circuit in the inverter.

The premature firing of the inverter valve, however, represents an abrupt change (namely, increase) in its firing angle, i.e., the period, in electrical degrees, for which the instant of the arrival of the firing pulse is delayed relative to the instant at which the anode potential of the valve rises above its cathode potential. Such an abrupt change in the firing angle brings about a reduction in the direct current voltage across the inverter and a considerable increase in the rectified current. As was pointed out above, this tends to reduce the margin angles of the other inverter valves and adds to the probability of development of disturbances.

Besides, this method fails to protect in any way the converter valves if the violation of the commutation sequence consists in the firing of a valve before its proper time.

Another known method for controlling a high-voltage direct current transmission system consists in maintaining the smallest of the margin angles of the inverter valves at the reference level by adjustably controlling the firing angles of the inverter valves (cf. U.S.S.R. Author's Certificate No. 466,822). In this case, however, abrupt changes in the firing angles of the inverter valves also heighten the probability of development of disturbances in the same way as hereinbefore shown. Controlling the firing angles with a time delay relative to variations in the margin angles also proves to be inexpedient, since the changes in the margin angles come too late to prevent development of disturbances.

Also known in the art is a method for controlling a high-voltage direct current transmission system having a rectifier of the controlled valve type at the transmitting end of the transmission system and an inverter of the controlled valve type at the receiving end of the transmission system, which comprises maintaining the current supplied from the rectifier to the inverter in accordance with its reference value by adjustably controlling the firing angles of the rectifier valves, and reducing the reference value of the current supplied from the rectifier to the inverter when any one of the following parameters concerning the state of the transmission system goes beyond the predetermined limits: rectified current or voltage, alternating current or voltage or their time derivatives, frequency of alternating current or voltage, or power factor (cf. U.S. Pat. No. 3,801,895). This method provides a reduction in the reference value of the current supplied from the rectifier to the inverter when a short-circuit occurs in an inverter phase. The reduction in the reference value of the rectified current ensures such an adjustment of the inverter valve firing angles, which inhibits the growth of the rectified current and hence, the reduction in the margin angles of the inverter valves caused by the increase in their commutation angles, thus making further development of disturbances less likely.

In this method, however, the reduction in the reference value of the rectified current is accomplished with a certain time delay relative to the occurrence of the short-circuit. Meanwhile, a further violation of the firing sequence of other valves may take place during said time delay thereby leading to further development of disturbances.

Besides, during said time delay a load dumping occurs which adversely affects the operating conditions of the consumers' equipment.

Furthermore, deviations in the aforementioned transmission system parameters may arise from malfunctions in the process of commutation of the rectifier valves, which produce a decline in the rectified current. In this case the further reduction of the rectified current according to the known method will prevent the system from transmitting the desired amount of power, thereby unfavorably affecting the operating conditions of the consumers' equipment.

Known in the art is a regulating device for operating a high-voltage direct current transmission system having a rectifier of the controlled valve type at the transmitting end of the transmission system and an inverter of the controlled valve type at the receiving end of the transmission system, comprising a control device for adjustably controlling the firing angles of the rectifier valves, sensing means for monitoring the current supplied from the rectifier to the inverter, signal forming means for developing a signal corresponding to the reference value of the current supplied from the rectifier to the inverter, and a comparison circuit having its output connected to the control device and its inputs connected, respectively, to the current sensing means and to the output of the signal forming means, wherein said signal forming means includes a switching circuit having its output connected to the input of the comparison circuit coupled to the signal forming means, one of the inputs of the switching circuit being supplied with a signal corresponding to the value of the current supplied from the rectifier to the inverter, which insures transmission of the prescribed amount of power from the rectifier to the inverter, and a program control device having its output connected to another input of the switching circuit for switching said switching circuit and for applying a signal to the input of the comparison circuit coupled to the signal forming means, which signal causes a reduction in the reference current value when one of the parameters concerning the state of the transmission system, i.e. rectified current or voltage, alternating current or voltage or their time derivatives, frequency of alternating current or voltage, or power factor, goes beyond the predetermined limits (cf. the above-mentioned U.S. Pat. No. 3,801,895).

This regulating device features the same disadvantages as the method.

SUMMARY OF THE INVENTION

It is an object of the present invention to provide a method for controlling a high-voltage direct current transmission system which reduces the probability of occurrence and further development of disturbances in the course of operation of the transmission system.

It is another object of the present invention to provide a method for controlling a high-voltage direct current transmission system which improves the operating conditions of the consumer equipment when load dumping or malfunctions in the process of commutation of the rectifier valves occur.

It is a further object of the present invention to provide a regulating device for implementing the proposed method.

With this and other objects in view there is proposed a method for controlling a high-voltage direct current transmission system having a rectifier of the controlled valve type at the transmitting end of the transmission system and an inverter of the controlled valve type at the receiving end of the transmission system, comprising maintaining the current supplied from the rectifier to the inverter in accordance with its reference value by adjustably controlling the firing angles of the rectifier valves, and varying the reference value of the current supplied from the rectifier to the inverter, wherein, according to the invention, the reference value of the current supplied from the rectifier to the inverter is varied in accordance with variations in the difference between a predetermined value and the smallest of the margin angles of the inverter valves when the smallest of the margin angles of the inverter valves falls below the predetermined value, so that the reference value of the current supplied from the rectifier to the inverter is reduced with increase in the difference between the predetermined value and the smallest of the margin angles of the inverter valves, and the reference value of the current supplied from the rectifier to the inverter is increased with reduction in the difference between the predetermined value and the smallest of the margin angles of the inverter valves, the reference value of the current supplied from the rectifier to the inverter being set above or equal to the minimum permissible value of the current supplied from the rectifier to the inverter.

According to the proposed method the reduction in the reference value of the current supplied from the rectifier to the inverter takes place immediately after the arrival of information on the inadmissible reduction in the margin angle of any one of the inverter valves. When false sequential operation of firing the inverter valves occurs the reference value of the rectified current is reduced immediately after the instant at which the anode potential of a valve rises above its cathode potential and the valve continues to conduct. This insures a rapid adjustment of the firing angles of the rectifier valves, which impedes the growth of the rectified current and prevents the reduction in the margin angles of the inverter valves, thereby reducing the probability of further development of disturbances and shortening the period of load dumping. In some cases the reduction in the reference value of the rectified current, according to the proposed method, is accomplished even before the violation of the correct firing sequence of the inverter valves takes place, i.e. in cases when the margin angles of the inverter valves become too small and a real danger arises that a short-circuit may occur. This diminishes the probability of occurrence of disturbances. According to the proposed method the reduction in the reference value of the rectified current depends on the margin angles of the inverter valves; therefore malfunctions in the process of commutation of the rectifier valves do not automatically cause the reduction in the rectified current and transmitted power thereby improving the operating conditions of the consumers' equipment.

The necessity for maintaining the rectified current at the level above or equal to its minimum permissible value arises from the fact that a smaller current makes the firing of the converter valves unreliable.

It is expedient to set the reference value of the current supplied from the rectifier to the inverter equal to the minimum permissible value of the current supplied from the rectifier to the inverter when the smallest of the margin angles of the inverter valves reaches its minimum permissible value. This makes it possible to provide the maximum counteraction to the growth of the rectified current when the margin angle of some of the inverter valves falls to the extent that there is a close to 100% probability that the deionization has no time to be completed.

With the aforestated objects in view there is also proposed a regulating device for controlling a high-voltage direct current transmission system having a rectifier of the controlled valve type at its transmitting end and an inverter of the controlled valve type at its receiving end comprising a control device for adjustably controlling the firing angles of the rectifier valves, current sensing means for monitoring the current supplied from the rectifier to the inverter, signal forming means for developing a signal corresponding to the reference value of the current supplied from the rectifier to the inverter, and a comparison circuit having its output connected to the control device and its inputs connected, respectively, to the current sensing means and to the output of the signal forming means, wherein according to the invention, there is further provided a measuring circuit for developing a signal corresponding to the smallest of the margin angles of the inverter valves, and the signal forming means includes a subtraction circuit having its one input connected to the output of the measuring circuit, another input of the subtraction circuit being supplied with a signal corresponding to a predetermined value of the margin angle, a limiter having its input connected to the output of the subtraction circuit for blocking the passage of a signal through the limiter when the smallest of the margin angles of the inverter valves exceeds the predetermined value, a second subtraction circuit having its one input connected to the output of the limiter, another input of the second subtraction circuit being supplied with a signal corresponding to the value of the current supplied from the rectifier to the inverter, which insures transmission of the prescribed amount of power from the rectifier to the inverter, and a minimum signal limiter having its input connected to the output of the second, subtraction circuit, the output of the minimum signal limiter being the output of the signal forming means for limiting the minimum value of the signal supplied from the output of the signal forming means to the input of the comparison circuit to the level corresponding to the minimum permissible value of the current supplied from the rectifier to the inverter.

In order to provide the maximum reduction in the rectified current when the smallest of the margin angles of the inverter valves reaches its minimum permissible value, it is expedient that the signal forming means should comprise a null-balance device having its one input connected to the output of the measuring circuit, another input of the null-balance device being supplied with a signal corresponding to the minimum permissible value of the smallest of the margin angles of the inverter valves, and a selector circuit connected between the input of the minimum signal limiter and the output of the second subtraction circuit and having its one input connected to the output of the second subtraction circuit and its another input connected to the output of the null-balance device, the output of the selector circuit being connected to the input of the minimum signal limiter for supplying a signal from the output of the second subtraction circuit to the input of the minimum signal limiter when the smallest of the margin angles of the inverter valves is greater than its minimum permissible value, and for applying to the input of the minimum signal limiter a signal to develop at its output a signal corresponding to the minimum permissible value of the current supplied from the rectifier to the inverter when the smallest of the margin angles of the inverter valves is less than its minimum permissible value.

The present invention allows to reduce the probability of occurrence and development of disturbances in the course of operation of a high-voltage direct current transmission system having a rectifier of the controlled valve type at its transmitting end and an inverter of the controlled valve type at its receiving end and to improve the operating conditions of the consumer equipment.

These and other objects and advantages of the present invention will become more apparent upon consideration of the following detailed description of its preferred embodiments taken in conjunction with the accompanying drawings.

The invention is further explained by a detailed description of its embodiments with reference to the accompanying drawings.

BRIEF DESCRIPTION OF THE DRAWINGS

FIGS. 3a to 3e show current and voltage waveforms obtained at various positions in an inverter bridge of the transmission system of FIG. 2.

DETAILED DESCRIPTION OF THE INVENTION

According to the proposed method the transmission system is operated as follows.

Figure 1:
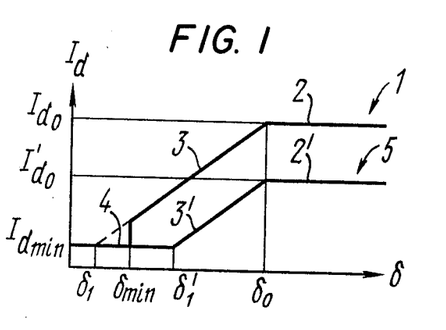
FIG. 1 shows curves characterising the variation of the reference value of the current supplied from the rectifier to the inverter in a high-voltage direct current transmission system as a function of the smallest of the margin angles of the inverter valves.

During transmission of electrical energy over the transmission system measurements are taken of the smallest of the values assumed by the margin angles of the inverter valves during each cycle. In accordance with the measured value, the reference value of the current supplied from the rectifier at the transmitting end of the system to the inverter at its receiving end is set and the current supplied from the rectifier to the inverter is maintained in accordance with the reference value by the respective adjustment of the firing angles of the rectifier valves. A curve 1 in FIG. 1 shows the variation of the reference value $I_d$ of the current supplied from the rectifier to the inverter as a function of the angle $\delta$ representing the smallest of the margin angles of the inverter valves. If the margin angles of all the inverter valves are greater than a certain predetermined value $\delta_o$, the current supplied from the rectifier to the inverter is maintained in accordance with its reference value $I_{do}$ which insures transmission of the prescribed amount of power from the rectifier to the inverter (a portion 2 of the curve 1). The value of $\delta_o$ is selected on the basis of the maximum permissible probability that an inverter valve will have no time to deionize and will continue to conduct. For high-voltage thyristors the value of $\delta_o$ is about 13°, the probability that the thyristor will have no time to deionize, being about 40%.

If the margin angle of some of the inverter valves falls below $\delta_o$, e.g. as a consequence of a reduction in the receiving power system voltage, of a connection of an additional load to the inverter or of a short-circuit of the valves in an inverter phase, the reference value of the current supplied from the rectifier to the inverter is reduced in proportion to the increase in the difference between the smallest of the margin angles of the inverter valves and $\delta_o$. In other words, the less the value assumed by the smallest of the margin angles of the inverter valves, the greater the reduction in the current reference value (a portion 3 of the curve 1). Due to the reduction in the current supplied from the rectifier to the inverter, the commutation angles of the inverter valves become smaller with the result that their margin angles increase. This makes a short-circuit in the inverter less likely and, if such a short-circuit occurs, lessens the probability of further development of disturbances.

As the margin angles of the inverter valves decrease, the current reference value is reduced until, at a certain value $\delta_1$ of the smallest margin angle of the inverter valves, it reaches the level of the minimum permissible value $I_{dmin}$ of the current supplied from the rectifier to the inverter, below which the firing of the rectifier and inverter valves becomes unreliable (the portion 3 of the curve 1 and its continuation shown in broken lines).

With a subsequent increase in the smallest margin angle of the inverter valves, i.e. with a reduction in the difference between the smallest margin angle and the angle $\delta_o$, the reference value of the current supplied from the rectifier to the inverter is increased in proportion to the reduction in said difference according to the portion 3 of the curve 1. As the smallest margin angle increases and reaches the value of $\delta_o$, the current reference value is reset equal to $I_{do}$.

According to another embodiment of the present invention the current reference value is also reduced within the limits from $I_{do}$ to $I_{dmin}$ with reduction in the smallest margin angle of the inverter valves, but, when the smallest margin angle reaches its minimum permissible value $\delta_{min}$, the current reference value is set equal to $I_{dmin}$, whereupon, with further reduction in the smallest margin angle, the current reference value remains equal to $I_{dmin}$ (a portion 4 of the curve 1). In this case $\delta_{min}$ is selected to have a value at which a great degree of probability exists that the valve will have no time to deionize and will remain conductive despite the firing of another valve of the same group. For high-voltage thyristors the value of $\delta_{min}$ is about 4°, with about a 90% probability that the thyristor will have no time to deionize. This provides the maximum reduction in the reference value of the current when a short-circuit in the inverter becomes practically inevitable.

If the prescribed amount of power transmitted from the rectifier to the inverter is changed, the reference value of the current supplied from the rectifier to the inverter also changes. The variation of the current reference value at a reduced prescribed value of transmitted power corresponding to the current reference value $I'_{do}$ smaller than $I_{do}$ is represented by a curve 5. In accordance with the curve 5 a reduction in the smallest margin angle of the inverter valves below the value of $\delta_o$ leads to reduction in the reference value of the current supplied from the rectifier to the inverter, proportional to increase in the difference between the smallest margin angle and the value of $\delta_o$ (a portion 3' of the curve 5). Upon further reduction in the smallest margin angle, the current reference value is reduced until it reaches the value of $I_{dmin}$, with the smallest margin angle being equal to $\delta'_1$, whereupon when the smallest margin angle falls below $\delta'_1$, the current reference value remains equal to $I_{dmin}$. When the margin angles of the inverter valves rise above $\delta'_1$ the current reference value is also raised in accordance with the portion 3' of the curve 5. When the smallest margin angle of the inverter valves reaches the value of $\delta_o$, the current reference value is set equal to $I'_{do}$ and remains unchanged with further increase in the margin angles (the portion 2' of the curve 5).

Figure 2:
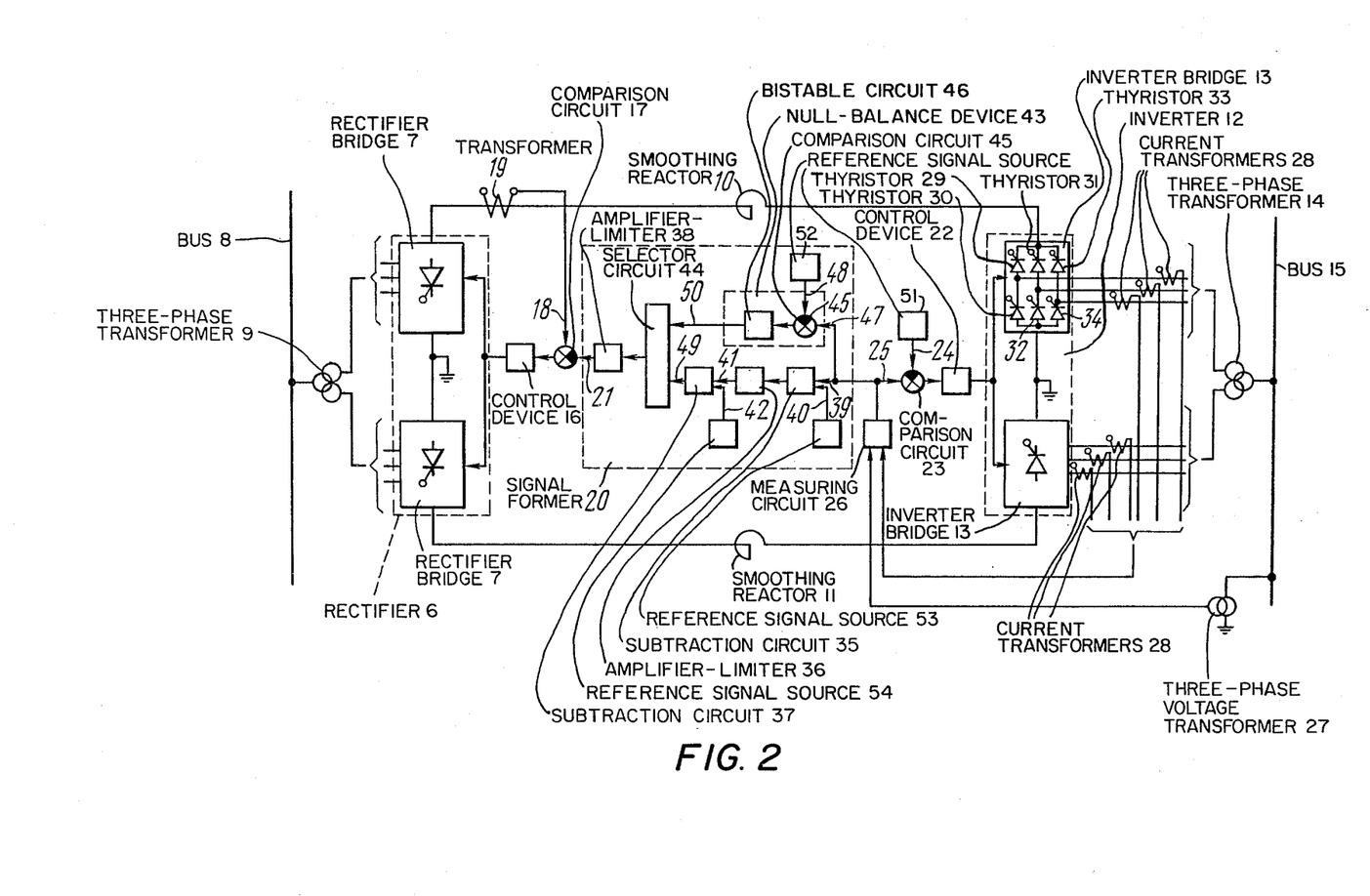
FIG. 2 is a block diagram of an embodiment of the high-voltage direct current transmission system of the invention.

FIG. 2 shows a block-diagram of a high-voltage direct current transmission system having a regulating device for varying the reference value of the current supplied from the rectifier to the inverter in accordance with the aforedescribed method. According to FIG. 2 the transmission system comprises a rectifier 6 consisting of two rectifier bridges 7 of the thyristor type, located at the transmitting end of the transmission system. The rectifier bridges 7 are fed with three-phase alternating current from buses 8 via a three-phase transformer 9. The voltage rectified by the bridges 7 is applied via smoothing reactors 10 and 11 to an inverter 12 consisting of two inverter bridges 13 of the thyristor type, located at the receiving end of the transmission system. The three-phase alternating voltage produced by the inverter bridges 13 is fed via a three-phase transformer 14 to the buses 15. The control electrodes of the thyristors of the rectifier bridges 7 are connected to the corresponding outputs of the control device 16 for adjustably controlling the firing angles of the thyristors of the rectifier bridges 7. These firing angles are set in accordance with the value of the signal supplied to the control device 16 from the output of a comparison circuit 17. One input 18 of the comparison circuit 17 is supplied with a signal from a current sensing means adapted for monitoring the current supplied from the rectifier 6 to the inverter 12, said current sensing means being a current transformer 19 coupled to one of the outgoing conductors of the rectifier 6.

The transmission system further comprises a signal forming means 20 for developing a signal corresponding to the reference value of the current supplied from the rectifier 6 to the inverter 12. The signal developed by the signal forming means 20 is proportional to the current reference value and is supplied to the other input 21 of the comparison circuit 17. The control electrodes of the thyristors of the inverter bridges 13 are connected to the corresponding outputs of a control device 22 for adjustably controlling the firing angles of the thyristors of the inverter bridges 13. These firing angles are set in accordance with the value of the signal supplied to the control device 22 from the output of a comparison circuit 23 having one input 24 supplied with a signal proportional to the reference value of the smallest margin angle of the thyristors of the inverter bridges 13, and another input 25 connected to the output of a measuring circuit 26, said measuring circuit 26 developing a signal proportional to the smallest of the margin angles of the thyristors belonging to the inverter bridges 13. The control device 22 comprises an integrating element (not shown) which insures the adjustment of the thyristor firing angles in the inverter bridges 13 with a time delay relative to changes in the signal at the output of the comparison circuit 23.

To form a signal proportional to the smallest of the margin angles, the measuring circuit 26 is supplied with signals from a three-phase voltage transformer 27 coupled to the buses 15, and from current transformers 28 coupled to the phase conductors connecting the inverter bridges 13 with the transformer 14. The measuring circuit 26 produces signals proportional to the margin angles. Then it compares these signals with each other and develops a signal proportional to the smallest of the margin angles. Such a circuit is described, for instance, in the aforementioned U.S.S.R. Author's Certificate No. 466,822.

Each of the inverter bridges 13 is a three-phase bridge having two thyristors 29 and 30, 31 and 32, 33 and 34 connected in series in each phase. The thyristors 29, 31 and 33 form a first group and have their cathodes connected to each other. The thyristors 30, 31 and 33 form another group having their anodes connected to each other and their cathodes connected to the anodes of the thyristors of the first group, hooked into the respective phases of the bridge 13. Direct voltage from the rectifier bridges 7 is applied to the interconnected cathodes of the thyristors 29, 31, 33 on one side, and to the interconnected anodes of the thyristors 30, 32, 34 on the other side. The inverted three-phase voltage is derived from between the points of connection of the thyristors in each phase. The rectifier bridges 7 are three-phase bridges similar in circuit to the inverter bridges 13.

The signal forming means 20 comprises a subtraction circuit 35, a limiter formed by an amplifier-limiter 36, a subtraction circuit 37, and a minimum signal limiter formed by an amplifier-limiter 38. One input 39 of the subtraction circuit 35 is connected to the output of the measuring circuit 26, and the other input 40 of the subtraction circuit 35 is supplied with a signal proportional to the predetermined value $\delta_o$ of the margin angle. The amplifier-limiter 36 has its input connected to the output of the subtraction circuit 35 and its output connected to the input 41 of the subtraction circuit 37. The other input 42 of the subtraction circuit 37 is fed with a signal proportional to the value $I_{do}$ of the current supplied from the rectifier 6 to the inverter 12, which insures transmission of the prescribed amount of power from the rectifier 6 to the inverter 12. The output of the amplifier-limiter 38 represents the output of the signal forming means 20 and is connected to the input 21 of the comparison circuit 17.

In accordance with one embodiment of the invention the input of the amplifier-limiter 38 is connected directly to the output of the subtraction circuit 37.

In accordance with another embodiment of the invention the signal forming means further comprises a null-balance device 43 and a selector circuit 44. The null-balance device 43 comprises a comparison circuit 45 and a bistable circuit 46 having its input connected to the output of the comparison circuit 45. One input 47 of the comparison circuit 45 is connected to the output of the measuring circuit 26 and the other input 48 of the comparison circuit 45 is supplied with a signal proportional to the minimum permissible value $\delta_{min}$ of the margin angle of the inverter thyristors. One input 49 of the selector circuit 44 is connected to the output of the comparison circuit 45, another input 50 of the selector circuit 44 is connected to the output of the bistable circuit 46, and the output of the selector circuit 44 is connected to the input of the amplifier-limiter 38.

The subtraction circuit 35 develops a positive signal at its output when the signal at its input 40 is greater than the signal at its input 39, and develops at its output a negative signal when the signal at its input 40 is less than the signal at its input 39. The amplifier-limiter 36 develops an output signal proportional to its input signal when the latter is positive and develops a zero output signal when its input signal is negative. The amplifier-limiter 38 limits the minimum value of its output signal to the level corresponding to the minimum permissible value $I_{dmin}$ of the current supplied from the rectifier 6 to the inverter 12. The null-balance device 43 and the selector circuit 44 are made so that when the signal at the input 47 of the comparison circuit 45 is greater than the signal at its input 48, the output signal of the bistable circuit 46 has a polarity inhibiting the passage of this signal through the selector circuit 44 and permitting the passage of the output signal of the subtraction circuit 37, and when the signal at the input 47 of the comparison circuit 45 is less than the signal at its input 48, the output signal of the bistable circuit 46 has a polarity permitting the passage of this signal through the selector circuit 44 and inhibiting the passage of the output signal of the subtraction circuit 37 and the level of the output signal of the bistable circuit 46 is, in this case, lower than the limit level of the amplifier-limiter 38.

The selector circuit 44 is a relay circuit or a diode switching circuit.

The signals applied to the inputs 24 and 48 of the comparison circuits 23 and 45 and to the inputs 40 and 42 of the subtraction circuits 35 and 37 are supplied, respectively, by the reference signal sources 51, 52, 53 and 54 formed each by a potentiometer (not shown) fed by a stabilized direct voltage.

If the transmission system is a rectifier-inverter substation connecting power systems operating at different frequencies, its parts are located close to each other (within the confines of one building). If, however, the transmission system connects power systems separated by a great distance, the input 21 of the comparison circuit 17 should be connected to the output of the amplifier-limiter 38 by means of a telecommunication channel.

In operation, signal levels are set at the inputs 24 and 48 of the comparison circuits 23 and 45 and at the inputs 40 and 42 of the subtraction circuits 35 and 37 by means of the reference signal sources 51, 52, 53 and 54, said signal levels being proportional, respectively, to the reference value of the smallest margin angle of the inverter thyristors (about 15°), to the minimum permissible value $\delta_{min}$ of the margin angle of the inverter thyristors (about 4°), to the predetermined value $\delta_o$ of the margin angle (about 13°) and to the current value $I_{do}$ insuring transmission of the prescribed amount of power.

In normal operational conditions of the transmission system the thyristor firing angles in the inverter bridges 13 are so adjusted that the smallest of the thyristor firing angles is maintained equal to its reference value. Upon the departure of the smallest of the margin angles from the reference value, an error signal appears at the output of the comparison circuit 23 in accordance with which the control device 22 adjusts the thyristor firing angles in the inverter bridges 13 so that the smallest of the margin angles should be equal to its reference value. As long as the smallest of the margin angles changes in such a way that it remains above the predetermined value $\delta_o$, the signal at the input 39 of the subtraction circuit 35 is greater than the signal at its input 40, the output signal of the subtraction circuit 35 is negative, and the output signal of the subtraction circuit 37 is proportional to the signal at its input 42, i.e. to the value $I_{do}$ of the current, insuring transmission of the prescribed amount of power. In case the output of the subtraction circuit 37 is connected directly to the input of the amplifier-limiter 38, the signal at the output of the amplifier-limiter 38 and at the input 21 of the comparison circuit 17 is proportional to the current $I_{do}$. The control device 16 adjusts the thyristor firing angles in the rectifier bridges 7 so that the signals at the inputs 18 and 21 of the comparison circuit 17 should be equal, i.e. so that the current supplied from the rectifier 6 to the inverter 12 should be equal to $I_{do}$.

When the smallest margin angle of the thyristors in the inverter bridges 13 falls below its predetermined value $\delta_o$, the signal at the input 39 of the subtraction circuit 35 becomes less than the signal at its input 40, whereby the said subtraction circuit develops at its output a positive signal proportional to the difference between the signals at its inputs 39 and 40. The output signal of the amplifier-limiter 36 in this case is proportional to the output signal of the subtraction circuit 35, i.e. to the difference between the predetermined value and the smallest margin angle of the inverter thyristors. The subtraction circuit 37 develops at its output a signal proportional to the difference between the signal at its input 42, which is, in turn, proportional to $I_{do}$, and the output signal of the amplifier-limiter 36. If the output of the subtraction circuit 37 is directly connected to the input of the amplifier-limiter 38, then, as long as the input signal of the amplifier-limiter 38 remains above or equal to the limit level, its output signal is proportional to the value of $I_{do}$ reduced by an amount proportional to the difference between the predetermined margin angle value $\delta_o$ and the smallest margin angle of the inverter thyristors. When the input signal of the amplifier-limiter 38 falls below the limit level, its output signal remains at a constant level corresponding to the minimum permissible current $I_{dmin}$. In accordance with the signal supplied to the input 21 of the comparison circuit 17 from the output of the amplifier-limiter 38, the control device 16 adjusts the thyristor firing angles in the rectifier bridges 7 so as to reduce the rectified current in proportion to the reduction in the smallest margin angle of the inverter thyristors relative to the predetermined value but not more than to the minimum permissible value of the rectified current.

If the signal forming means 20 comprises the null-balance device 43 and the selector circuit 44, then, as long as the smallest margin angle of the inverter thyristors remains above its minimum permissible value $\delta_{min}$, the signal at the output of the amplifier-limiter 38 and at the input 21 of the comparison circuit 17 is formed as hereinbefore described. In this case the signal at the input 47 of the comparison circuit 45 is greater than the signal at its input 48, whereby the bistable circuit 46 produces at its output a signal that permits the passage of a signal from the output of the subtraction circuit 37 to the input 65 of the amplifier-limiter 38. When the smallest margin angle of the inverter thyristors falls below its minimum permissible value $\delta_{min}$, the signal at the input 47 of the comparison circuit 45 becomes less than the signal at its input 48. The output signal of the bistable circuit 46 reverses its polarity and comes to the input of the amplifier-limiter 38, whereby the output signal of the latter is set at a level corresponding to the minimum permissible current $I_{dmin}$ and is fed to the input 21 of the comparison circuit 17.

In accordance with this signal the control device 16 adjusts the thyristor firing angles in the inverter bridges 7 so as to set the value of the current flowing from the rectifier 6 to the inverter 12 equal to its minimum permissible value.

The aforementioned reduction in the margin angles of the thyristors of the inverter bridges 13 produces at the output of the comparison circuit 23 a corresponding error signal which tends to alter the firing angles of the inverter thyristors. However, due to the integrating element incorporated in the control device 22, the alteration of the firing angles is too slow to cause an increase in the rectified current.

Figures 3A, 3E:
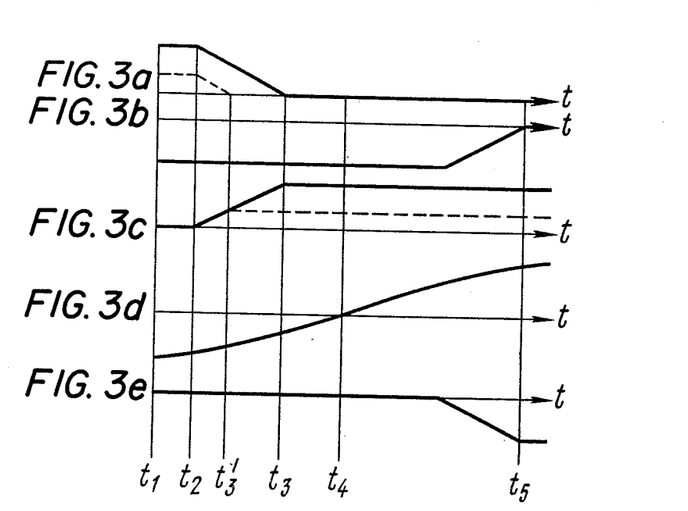

The change in the margin angles of the inverter thyristors in the course of operation of the proposed regulating device is illustrated by FIG. 3 which shows voltage and current waveforms obtained in the inverter bridge 13 (FIG. 2) at the extinguishment of the thyristors 29 and 34 and the firing of the thyristors 31 and 30. According to FIG. 3 at time $t_1$ the current in the inverter bridge 13 (FIG. 2) flows through the thyristors 29 and 34, the other thyristors of the bridge 13 being in the non-conductive state. The currents flowing through the thyristors 29 and 34 are shown in solid lines in FIG. 3a and FIG. 3b, respectively. At time $t_2$ a firing pulse is applied to the control electrode of the thyristor 31 (FIG. 2). The current flowing through the thyristor 31 is shown in FIG. 3c. It can be seen from FIG. 3c that after the arrival of the firing pulse the current flowing through the thyristor 31 (FIG. 2) grows for a certain period from zero to a steady value reaching the latter at time $t_3$ (FIG. 3). As the current flowing through the thyristor 31 (FIG. 2) grows, the current passing through the thyristor 29 falls to zero, since its anode potential is negative in relation to the anode potential of the thyristor 31, as seen in FIG. 3d which shows the variation of the voltage between the anodes of the thyristors 29 and 31 (FIG. 2). The period from time $t_2$ to time $t_3$ (FIG. 3), measured in electrical degrees, represents the commutation angle. At time $t_4$ the anode potential of the thyristor 29 (FIG. 2) becomes positive relative to the anode potential of the thyristor 31. The period from time $t_3$ to time $t_4$ (FIG. 3), measured in electrical degrees, represents the margin angle of the thyristor 29 (FIG. 2). This period must be sufficiently great so that the thyristor 29 may have time to deionize after its current is cut off at time $t_3$ (FIG. 3). Otherwise the thyristor 29 (FIG. 2) becomes conductive again after time $t_4$ (FIG. 3) and after the firing of the thyristor 30 (FIG. 2) at time $t_5$ (FIG. 3) a short-circuit occurs in the inverter bridge 13 (FIG. 2) via the thyristors 29, 30. The current flowing through the thyristor 30 is shown in FIG. 3e.

In the course of operation of the regulating device, if the margin angle of the thyristor 29 (FIG. 2) falls below the level at which its spontaneous refiring becomes likely, i.e. below $\delta_o$, the signal at the output of the measuring circuit 26 falls below the signal at the input 40 of the subtraction circuit 35. This causes a reduction in the signal at the input 21 of the comparison circuit 17, which, in turn, leads to a reduction in the rectified current proportional to the departure of the margin angle of the thyristor 29 from the value of $\delta_o$, as hereinbefore described in detail. Hence, the current flowing through the thyristor 29 decreases, thus causing a reduction in the commutation angle and a more rapid decline of the current in the thyristor 29 to zero. The current flowing through the thyristor 29, in this case is shown by broken lines in FIG. 3a. It is seen from FIG. 3a that the thyristor 29 (FIG. 2) in this case is completely extinguished at time $t_3'$ (FIG. 3), i.e. before time $t_3$, whereby the margin angle of the thyristor 29 (FIG. 2) increases by a corresponding amount, thus preventing the spontaneous refiring of the thyristor 29. The current through the thyristor 34 in this case is shown in FIG. 3c by broken lines.

If, however, for some reason, e.g. because of the breakdown or incomplete deionization of the thyristor 29 (FIG. 2) or because of the failure of the thyristor 34 to turn on at the required time, the thyristor 29 remains conductive after time $t_4$ (FIG. 3), this will immediately lead to development of the zero signal at the output of the measuring circuit 26 (FIG. 2), since the margin angle of the thyristor 29 in this case is equal to zero. This results in a signal proportional to the minimum permissible value $I_{dmin}$ of the rectified current appearing at the input 21 of the comparison circuit 17, as hereinbefore described. The control device 16 will adjust the firing angles of the thyristors of the rectifier bridges 7 to insure a reduction in the rectified current, or, at least, the maximum counteraction to its growth, thereby preventing the increase in the commutation angles of the other thyristors of the inverter bridges 13 and the reduction in their margin angles.

As is seen from the foregoing, the reduction in the current reference value by the use of the proposed regulating device is made immediately after time $t_4$ (FIG. 3), which insures a very rapid response to a violation of the firing sequence or an impermissible reduction in the margin angles of the inverter thyristors.

The present invention provides a means for reducing the probability of occurrence and further development of disturbances in the course of operation of a high-voltage direct current transmission system and for improving the operating conditions of the consumer equipment. With the firing angle of the inverter thyristors being 145°, the present invention provides the reduction of the rectified current from 2,000 to 500 amperes in 4 milliseconds after the occurrence of a short-circuit in a phase of the inverter bridge.

While the invention is described herein in terms of the preferred embodiments, numerous modifications may be made without departure from the spirit and scope of the invention as defined in the following claims.

What is claimed is:

1. A method for controlling a high-voltage direct current transmission system having a rectifier of the controlled valve type at its transmitting end and an inverter of the controlled valve type at its receiving end, said method comprising the steps of maintaining the current supplied from said rectifier to said inverter in accordance with its reference value by adjustably controlling the firing angles of the rectifier valves; and varying the reference value of the current supplied from said rectifier to said inverter in accordance with variations in the difference between a predetermined value and the smallest of the margin angles of the inverter valves when the smallest of the margin angles of the inverter falls below said predetermined value, so that the reference value of the current supplied from said rectifier to said inverter is reduced with an increase in the difference between said predetermined value and said smallest of the margin angles of the inverter valves, and the reference value of the current supplied from said rectifier to said inverter is increased with a reduction in the difference between said predetermined value and said smallest of the margin angles of the inverter valves, the reference value of the current supplied from said rectifier to said inverter being set above or equal to the minimum permissible value of the current supplied from said rectifier to said inverter.

2. A method as claimed in claim 1, wherein the reference value of the current supplied from said rectifier to said inverter is set equal to said minimum permissible value of the current supplied from said rectifier to said inverter when said smallest of the margin angles of the inverter valves reaches its minimum permissible value.

3. A high-voltage direct current transmission system, said transmission system having a receiving end and a transmitting end, said transmission system comprising a rectifier of the controlled valve type at the transmitting end of said transmission system;

a control device for adjustably controlling the firing angles of the rectifier valves;

an inverter of the controlled valve type at the receiving end of said transmission system, said inverter including inverter valves and being fed with the current supplied by said rectifier;

current sensing means for monitoring the current supplied from said rectifier to said inverter;

a comparison circuit having first and second inputs and an output, the first input of said comparison circuit being connected to said current sensing means and the ouput of said comparison circuit being connected to said control device;

a measuring circuit for developing a signal corresponding to the smallest of the margin angles of the inverter valves, said measuring circuit having an output; and signal forming means for developing a signal corresponding to the reference value of the current supplied from said rectifier to said inverter, said signal forming means including a first subtraction circuit having first and second inputs and output, the first input of said first subtraction circuit being connected to the output of said measuring circuit, the second input of said first subtraction circuit being supplied with a signal corresponding to a predetermined value of the margin angle, a first limiter having an input and an output, said input of said first limiter being connected to the output of said first subtraction circuit for blocking the passage of a signal through said first limiter when the signal at the first input of said first subtraction circuit is greater than the signal at said second input thereof, a second subtraction circuit having first and second inputs and an output, the first input of said second subtraction circuit being connected to the output of said first limiter, the second input of said second subtraction circuit being supplied with a signal corresponding to the value of the current supplied from said rectifier to said inverter, which insures transmission of the prescribed amount of power from said rectifier to said inverter, and a second limiter having an input and an output, the input of said second limiter being connected to the output of said second subtraction circuit, the output of said second limiter being connected to the second input of said comparison circuit, for limiting the minimum value of the signal applied to the second input of said comparison circuit to the level corresponding to the minimum permissible value of the current supplied from said rectifier to said inverter, whereby a signal is applied to said second input of said comparison circuit, which insures a variation of the reference value of the current supplied from said rectifier to said inverter in accordance with the difference between said predetermined value and the smallest of the margin angles of the inverter valves when the smallest of the margin angles of the inverter valves falls below said predetermined value, the reference value of the current supplied from said rectifier to said inverter being set above or equal to said minimum permissible value of the current supplied from said rectifier to said inverter.

4. A high-voltage direct current transmission system as claimed in claim 3, wherein said signal forming means further comprises a null-balance device having first and second inputs and an output, the first input of said null-balance device being connected to the output of said measuring circuit, the second input of said null-balance device being supplied with a signal corresponding to the minimum permissible value of the smallest of the margin angles of the inverter valves, and a selector circuit having first and second inputs and an output said selector circuit being connected between the input of said second limiter and the output of said second subtraction circuit, the first input of said selector circuit being connected to the output of said second subtraction circuit, the second input of said selector circuit being connected to the output of said null-balance device and the output of said selector circuit being connected to the input of said second limiter, for supplying a signal from the output of said second subtraction circuit to the input of said second limiter when the signal at the first input of said null-balance device is greater than the signal at the second input of said null-balance device, and for applying to the input of said second limiter a signal which produces at the output of said second limiter a signal corresponding to said minimum value of the current supplied from said rectifier to said inverter when the signal at the first input of said null-balance device is less than the signal at the second input of said null-balance device.

* * * * *